United States Patent [19]

Ohashi

[11] 4,434,339
[45] Feb. 28, 1984

[54] MOUNTING FRAME EQUIPPED WTH DECORATIVE PLATE FOR MOUNTING SWITCH OR THE LIKE

[75] Inventor: Shigeo Ohashi, Tokyo, Japan

[73] Assignee: Nihon Kaiheiki Kogyo Kabushiki Kaisha, Tokyo, Japan

[21] Appl. No.: 425,369

[22] Filed: Sep. 28, 1982

Related U.S. Application Data

[62] Division of Ser. No. 306,821, Sep. 29, 1981, Pat. No. 4,406,936.

[30] Foreign Application Priority Data

Oct. 11, 1980 [JP] Japan .......................... 55-145034[U]
Feb. 20, 1981 [JP] Japan ........................... 56-23743[U]

[51] Int. Cl.³ .............................................. H01H 9/00
[52] U.S. Cl. .................................. 200/295; 200/296; 248/27.3
[58] Field of Search ............... 200/295, 296; 248/27.1, 248/27.3; 340/815.14

[56] References Cited

U.S. PATENT DOCUMENTS

| | | | |
|---|---|---|---|
| 3,217,319 | 11/1965 | Rueger | 248/27.1 |
| 3,571,548 | 3/1971 | Osika | 200/295 |
| 3,887,777 | 6/1975 | Nishino | 200/295 |
| 3,903,458 | 9/1975 | Arnoux | 248/27.1 |
| 4,055,738 | 10/1977 | Beck | 248/27.1 |
| 4,340,795 | 7/1982 | Arthur | 200/295 |

FOREIGN PATENT DOCUMENTS 2559398 9/1976 Fed. Rep. of Germany ...... 200/295

*Primary Examiner*—John W. Shepperd
*Attorney, Agent, or Firm*—Lawrence I. Field

[57] ABSTRACT

Disclosed herein is a mounting frame equipped with a decorative plate, for mounting a switch or the like. The mounting frame includes a decorative plate having a through-hole formed thereon so as to mate with a sleeve which is step-wise formed at the upper portion of a switch, a pilot lamp or the like, and leg portions vertically suspended from the lower end portions on both sides of the decorative plate. When the sleeve is fitted into the through-hole while the inner side surfaces of the leg portions or a bridge interconnecting the lower portions of both leg portions are anchored to the corresponding outer side surfaces of the switch, the pilot lamp or the like, the switch, the pilot lamp or the like can be mounted to, and dismounted from, the mounting frame in one-touch operation.

5 Claims, 14 Drawing Figures

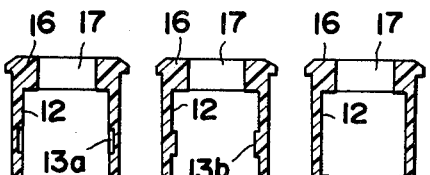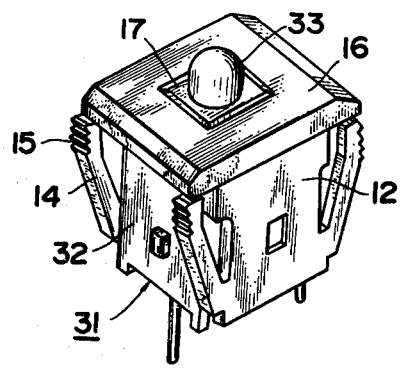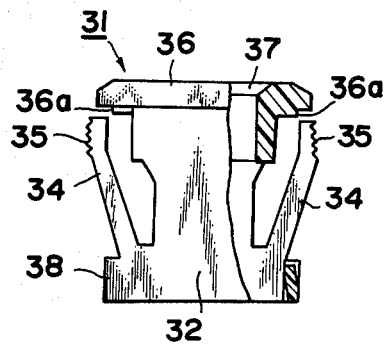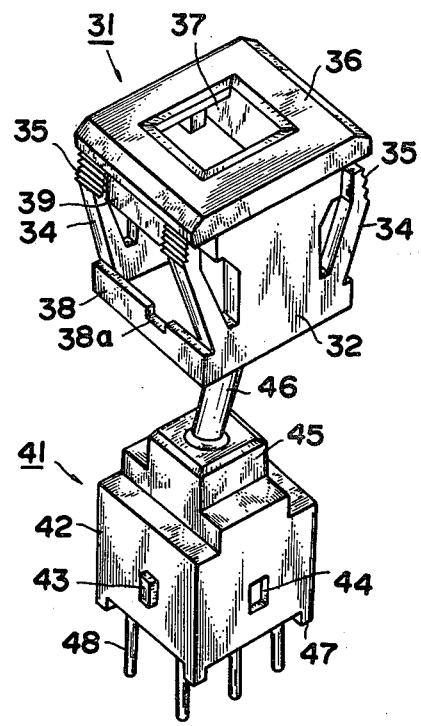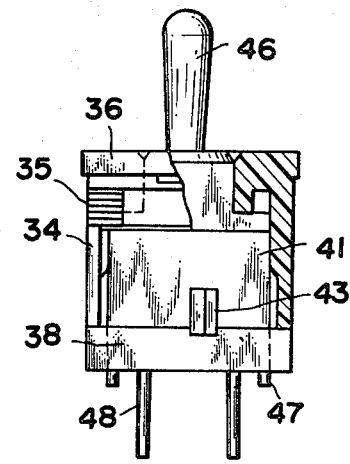

MOUNTING FRAME EQUIPPED WITH DECORATIVE PLATE FOR MOUNTING SWITCH OR THE LIKE

This is a division of application Ser. No. 306,821 filed Sept. 29, 1981 now U.S. Pat. No. 4,406,936.

BACKGROUND OF THE INVENTION

This invention relates to a small switch, a pilot lamp or the like, and specifically, to a mounting frame equipped with a decorative plate, suited for mounting a small switch, a pilot lamp or the like. More particularly, the present invention relates to a mounting frame equipped with a decorative plate, for mounting a switch, a pilot lamp or the like that has a construction in which, when a mounting frame formed by a synthetic resin material having resiliency is placed on the switch main body or on the pilot lamp, a sleeve step-wise formed on the switch main body or the pilot lamp first engages with a through-hole of the mounting frame, and protuberances or recesses defined on both side surfaces of the switch main body or the pilot lamp then engage with recesses or protuberances of the mounting frame, or with recesses (or two protuberances or through-holes) formed on a bridge interconnecting both legs of the mounting frame, in the concavo-convex relation, so that the mounting frame can be fitted to the switch main body or to the pilot lamp in one-touch operation and the resulting switch or pilot lamp-mounting frame assembly can be fitted to a panel hole of an instrument or equiment in one-touch operation.

Conventional mounting frames equipped with a decorative plate of this kind have the construction such as shown in FIGS. 1 and 2. The detail of the switch construction is disclosed in Japanese Utility Model Publication No. 48,284/1978 granted on the Applicant of the present invention, by way of example.

However, the switch mounting frame 1 formed integrally by a synthetic resin material such as shown in FIGS. 1 and 2 is fitted to a switch main body 5 as leg portions 2 on both sides are engaged with the corresponding side surfaces of the switch main body 5 and protuberances 6 of the switch main body 5 are fitted into corresponding through-holes 3 at the lower end portions of the legs 2, respectively. Accordingly, when the switch is inserted and fitted to a panel 8, resilient plates 4 on the right and left sides of the mounting frame 1 are inwardly pushed at the time of mounting so that a force acts upon the point 4a and consequently, the resilient plates 4 operate as if they were a seesaw. As a result, the lower portions of the resilient plates 4, that is, the lower portions of the legs 2, float up from the switch main body 5 and come off from the protuberances 6. Namely, the leg portions 2 are likely to come off from the switch main body 5 due to the force in the switch operation of a push button switch 7, for example.

If the mounting frame 1 is used for a toggle or lever switch instead of the push button switch shown in FIGS. 1 and 2, the thickness of the leg portions is small and a force is applied between the switch and the mounting frame in the direction of thickness of the legs 2 and the resilient plates, but not in the direction of their width, upon operation of an operating element. For these reasons, the abovementioned seesaw operation is further enhanced and the leg portions undergo strain and shaking so that the mounting frame floats up from the panel, thereby losing stability. Obviously, the drawback of the former is further amplified in the latter.

Furthermore, since the leg portions 2 and resilient plates 4 are disposed on both right and left side surfaces of the switch (on both side surfaces corresponding to the switch operating direction in the case of a toggle switch or the like), the transverse width B' of the panel hole must necessarily be greater than that A' of the switch and hence, panel cut of a greater size is necessary.

In addition, shaking or unstability is likely to occur between the switch main body and the mounting frame even under the state in which the latter is fixed to the former, because the mounting frame is fitted to the switch main body as the protuberances 6 on both sides of the switch main body 5 are fitted into the through-holes 3 of the legs 2 of the mounting frame 1 but no other fixing means exists. Since the lowermost portions of the mounting frame consists only of the leg portions that are thin and narrow, they are likely to undergo deformation and to cause shaking when applied with a force in the direction of their thickness.

SUMMARY OF THE INVENTION

The present invention is directed to eliminate the abovementioned various problems with the prior art devices. It is therefore an object of the present invention to provide a novel mounting frame equipped with a decorative plate, for mounting a switch or the like which can be tightly and easily mounted to and dismounted from a switch main body, a pilot lamp or the like and which prevents shaking of the coupled assembly of the frame and the switch or the like after fitted to a panel during the switch operation by a switch operating element.

The abovementioned object of the present invention can be accomplished by a mounting frame equipped with a decorative plate, for mounting a switch or the like, which comprises a decorative plate equipped with a through-hole to engage with a sleeve disposed at the upper part of a switch main body, a pilot lamp or the like, leg portions vertically suspended from the lower end portions on both sides of the decorative plate and anchored to the side surfaces of the switch main body in the concavo-convex relation or by lock pawls, and resilient plates formed to extend upwardly from the corners at both end portions of the leg portions so that a force applied thereto is directed in the direction of width of the leg portions, whereby the decorative plate, the leg portions and the resilient plates are integrally molded with one another.

According to the present invention, the mounting frame for a switch, a pilot lamp or the like is fitted to the switch main body, the pilot lamp or the like at at least two positions. Namely, the through-hole of the mounting frame engages with the sleeve of the switch main body or the like while the leg portions or bridges of the mounting frame are tightly fitted to the side surfaces of the switch main body or the like in the concavo-convex relation. According to this construction, coupling between the switch main body or the like and the mounting frame becomes tight and rigid. Hence, when the device of the present invention is applied to switches or pilot lamps of various kinds, coupling between the switch and the mounting frame and between the coupled assembly of the switch and the mounting frame and the panel never undergoes shaking or unstability due to the switch operation or to impact or vibration applied thereto.

In accordance with the present invention, the resilient plates to be fitted to the panel hole in one-touch operation are shaped such that the force acts in the direction of width but not in the direction of thickness of the leg portions, that is, the resilient plates are formed on the right and left sides of the leg portions in the direction of a reduced width but not in the direction of an increased width of the legs. Accordingly, even when the resilient plates inwardly push the leg portions during the switch operation or due to impact or the like after the switch or the pilot lamp fitted to the mounting frame is fitted into the panel hole, the direction of the force generated by the switch operation is directed in the direction of width of the leg portions so that no force at all occurs in such a direction as to outwardly open the leg portions away from the switch main body or the like. This arrangement perfectly eliminates the problems with the prior art device that engagement between the switch main body and the mounting frame in the concavo-convex relation is released to result in unstability or the switch floats up from the panel during the switch operation.

BRIEF DESCRIPTION OF THE DRAWINGS

FIGS. 6(a), (b) and (c) are sectional views showing modified examples of the first embodiment;

FIG. 7 is a perspective view when the first embodiment is applied to a pilot lamp;

FIG. 8 is a partially sectional front view showing a second embodiment of the present invention;

FIG. 9 is a perspective view of the second embodiment shown in FIG. 8;

FIGS. 10 and 11 are partially sectional front views showing the state in which the second embodiment is fitted to the switch;

DESCRIPTION OF THE PREFERRED EMBODIMENTS

Next, preferred embodiments of the present invention will be described in detail by referring to the accompanying drawings.

Figure 5:
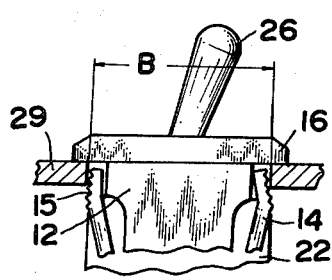
FIG. 5 is a partial front view showing the state in which the switch using the mounting frame in the first embodiment is mounted to a panel.
Figure 3:
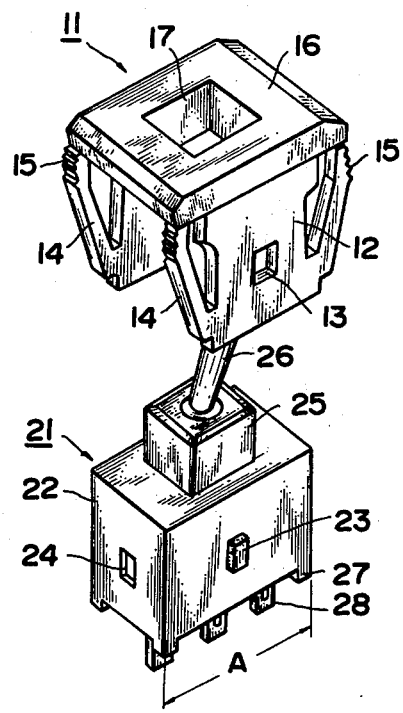
FIG. 3 is a perspective view showing a first embodiment of the present invention.
Figure 4:
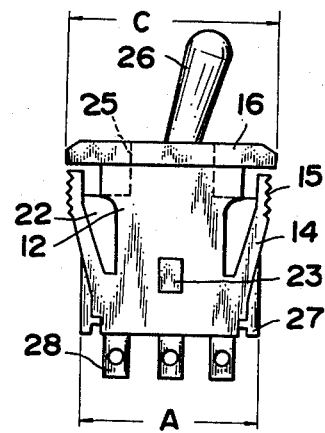
FIG. 4 is a front view showing the state in which the mounting frame of the first embodiment shown in FIG. 3 is fitted to a switch.

FIGS. 3 through 5 show the mounting frame equipped with a decorative plate for mounting the switch or the like in accordance with a first embodiment of the present invention, in which FIG. 3 is a perspective view, FIG. 4 is a front view under the state where the mounting frame of the present invention is fitted to the switch main body and FIG. 5 is a partial front view under the state where the switch main body is mounted to the panel by use of the mounting frame of the present invention.

In the drawings, reference numeral 11 represents the mounting frame equipped with the decorative plate for mounting the switch in accordance with the present invention. The mounting frame 11 includes two leg portions 12 extending vertically in parallel to each other and having through-holes 13 on their side surfaces, resilient plates 14 so formed as to upwardly extend from the lower end corners on both sides of the leg portions 12 and having outwardly open corrugated portions 15 at their tips and a decorative plate 16 disposed above both leg portions 12 and having a through-hole 17 at its center. The leg portions 12, the resilient plates 14 and the decorative plate 16 are integrally formed by a molding material having resiliency.

Reference numeral 21 represents a switch to which the abovementioned switch mounting frame 11 is to be fitted. The switch 21 consists of a switch main body 22 equipped on both side surfaces thereof with protuberances 23 engaging with the abovementioned through-holes 13 and incorporating therein a switch changeover operation mechanism (not shown), and a sleeve 25 bonded to, or integrally formed with, the upper portion of the switch main body 22 and fitting to the abovementioned through-hole 16. A handle 26 is supported and allowed to incline by the sleeve 25.

When the mounting frame 11 equipped with the decorative plate for mounting the switch or the like, that has the abovementioned construction, is fitted to the switch 21, the protuberances 23 of the switch main body 22 engage with the through-holes 13 of the mounting frame 11 and the sleeve 25 engages with the through-hole 17, respectively, so that the switch 21 is tightly mounted to the mounting frame 11 by one-touch operation as shown in FIG. 4. FIG. 5 shows the state in which the switch 21 mounted to the mounting frame 11 is inserted and fitted to a hole of a panel 29 by one-touch operation. In this instance, since the resilient plates 14 push the inner circumferential wall of the panel hole by their own resiliency and their protuberances 15 catch the four corners of the inner wall of the panel hole, coupling between these members becomes extremely tight and rigid.

From the coupling state shown in FIG. 5, the switch 21 can easily be removed from the panel 29 by pulling out the switch 21 while inwardly pushing the resilient plates 14 by the finger tip. To remove the mounting frame 11 from the switch 21, the leg portions 12 on both sides are outwardly expanded so as to disengage the protuberances 23 of the switch main body.

FIGS. 6a through 6c are sectional views showing a modified example of the first embodiment of the present invention. FIG. 6a shows an example in which recesses 13a are employed in place of the protuberances 13, and FIG. 6b shows an example in which protuberances 13b are employed in place of the through-holes 13. In the latter case, recesses that fit to the protuberances 13b must be disposed in place of the protuberances 23 on the side surfaces of the switch main body 22. FIG. 6c shows an example in which pawl plates 13c are disposed at the lower portions of the leg portions 12 in place of the through-holes 13. In this case, the pawl plates 13c engage with protuberances 27 disposed at the four corners of the lower portion of the switch main body 22. As still another alternative, it is possible to form a recess on one of the leg portions and a protuberance on the other in order to fit the mounting frame 11 to the switch 21.

In accordance with the first embodiment of the present invention constructed as described above, the switch mounting frame 11 is fitted to the switch 21 at at least two positions. Namely, the through-hole 17 of the decorative plate 16 engages with the sleeve 25 of the switch 21 and both leg portions 12 tightly engage with both external side surfaces of the switch 21 in the concavo-convex relation. (The two through-holes 13 of the leg portions 12 engage with the two protuberances 23 on the side surfaces of the switch main body, in the same way as other embodiments of the invention.) In consequence, coupling between the switch and the mounting frame becomes strong, and when the device of the present invention is adapted to a switch of any kind such as a toggle switch, a lever switch, a push switch, a wave-shaped switch or the like, coupling between the switch and the mounting frame and between the switch mounting assembly and the panel never undergoes shaking and never becomes unstable due to the switch operation or vibration or impact applied thereto.

In accordance with the first embodiment of the present invention, further, the resilient plates 14 are so shaped that a force acts upon the legs 12 in the direction of their width. In other words, they are formed on the right and left side surfaces of the leg portions 12 in the direction of a reduced width but not in the direction of an increased width. According to this arrangement, when the switch fitted with the resilient plates is mounted to the panel hole and the resilient plates 14 inwardly push the leg portions 12 upon the switch operation, the force acting upon them is guided in the direction of width of the leg portions so that no force at all occur which attempts to outwardly expand the leg portions 12 away from the switch main body 22. Accordingly, this arrangement perfectly eliminates the problems that coupling between the switch main body and the mounting frame in the convavo-convex relation is released or becomes unstable, and the switch accidentally floats up from the panel surface during the switch operation.

According to the first embodiment, further, the positions of forming the leg portions 12 and resilient plates 14 of the switch mounting frame 11 are so selected that they are positioned in the longitudinal direction of the side surfaces with respect to the switch main body 22 (or in the orthogonal direction with respect to the switch operating direction in the case of a toggle switch). Hence, the dimension of the width on the right and left of the panel hole may be almost the same as the width on the right and left of the switch main body. This makes it possible to reduce the size of the panel hole in the switch operating direction, the mounting space and the size of the switch device.

In FIGS. 3 through 5, symbol A represents the width of the switch and B represents the panel hole of the device for fitting the switch. Symbol C represents the width of the decorative plate 16. In accordance with the prior art device, the relation of these width is $A' < B'$, but the device in accordance with the present invention makes it possible to satisfy the relation $A \approx B$. For the same reason as above, the width of the decorative plate 16 can also be reduced as much so that the panel surface of the device can be utilized more effectively.

In the first embodiment of the present invention, the mounting frame as a whole is integrally molded by a synthetic resin material. Hence, it can be produced at a reduced cost. Furthermore, the switch mounting frame equipped with the decorative plate can be inserted and fitted to the switch main body by one-touch operation while the switch mounting assembly can also be fixed to the panel hole of the device by one-touch operation.

In this embodiment, the through-hole 17 of the decorative plate 16 and the sleeve 25 of the switch mating with the former are a square hole and a square pole, respectively, but they may of course be a round hole and a round pole, respectively. Though the switch 21 used in this embodiment is for panel fitting, it is of course possible to use a switch for a printed circuit board, the terminals 28 of which are made of a round bar wire material. In such a case, replaceability with a bracket for fitting the printed circuit board can be obtained and this is obviously extremely convenient.

FIG. 7 is a perspective view showing the construction when the first embodiment of the present invention as described above is applied to a pilot lamp in place of the switch. In the drawing, reference numeral 31 represents the pilot lamp, 32 is a pilot lamp main body and 33 is a light-emitting member such as an LED or a lamp. The pilot lamp 31 has the same elements such as the switch main body 22, sleeve 25 and the like of the switch 21 and its mounting operation to the mounting frame 11 equipped with the decroative plate is exactly the same as that of the switch 21.

Figure 11:
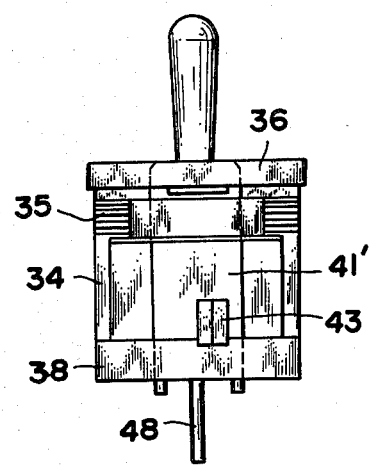

FIGS. 8 through 11 show the mounting frame equipped with the decorative plate for mounting the switch or the like in accordance with the second embodiment of the present invention, in which FIG. 8 is a partially sectional front view, FIG. 9 is a perspective view and FIGS. 10 and 11 are partially sectional side views when the mounting frame of the present invention is fitted to the switch main body.

In the drawings, reference numeral 31 represents the mounting frame equipped with the decorative plate for mounting the switch or the like in accordance with the present invention. The switch mounting frame 31 includes two leg portions 32 extending vertically in parallel to each other, resilient plates 34 so formed as to upwardly extend from the lower end corner portions on both sides of the leg portions 32 and having outwardly open corrugated portions 35 at their tips, a decorative plate 36 disposed above both leg portions 32 and equipped at its center with a through-hole 37, a bridge 38 disposed transversely between the lower portions of the two resilient plates 34 and equipped at its center with a slit 38a and another bridge (interconnecting plate) 39 disposed transversely between both upper portions of the resilient plates 34. All of the leg portions 32, resilient plates 34, decorative plate 36 and bridges 38 and 39 are integrally formed by a molding material having resiliency. Reference numeral 39a represents protuberances that are formed on the lower surface on both of its right and left sides.

Reference numeral 41 represents a switch to which the abovementioned switch mounting frame 31 is to be fitted. The switch consists of a switch main body 42 having, on its both side surfaces, recesses 43 to mate with the abovementioned recesses 38a and incorporating therein a switch change-over mechanism (not shown), and a sleeve 45 coupled to, or integrally formed with, the upper portion of the switch main body 42 and fitting to the abovementioned through-hole 37. A handle 46 is supported and permitted to incline by the sleeve 45. Incidentally, reference numeral 48 represents terminals that are formed by a round bar wire material.

Figure 14:
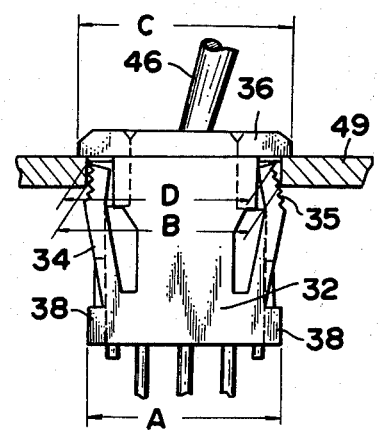
FIG. 14 is a partially sectional front view showing the state in which the switch is mounted to the panel by use of the second embodiment of the invention.

When the mounting frame 31 equipped with the decorative plate having the abovementioned construction is fitted to the switch 41, the protuberances 43 of the switch main body 42 engage with the recesses 38a of the mounting frame 31 and the sleeve 45 engages with the through-hole 37. Thus, the mounting frame 31 can tightly be fitted to the switch 41 by one-touch operation as shown in FIG. 10. FIG. 14 shows the state when the switch 41 fitted to the mounting frame 31 is inserted and fitted into a panel hole 49 by one-touch operation. In this instance, the resilient plates 34 push the inner circumferential wall of the panel hole by their own resiliency while the corrugated portions 35 catch firmly the four corners of the inner wall of the panel hole so that coupling between these members becomes extremely tight and rigid. In FIG. 14, reference symbols A, B, C and D represent the dimensions of the lower portion of the mounting frame, the panel hole, the decorative plate 36 and the length between the right and left external side surface of the lower protuberance 36a of the decorative plate, respectively. These dimensions are so selected as to satisfy the relation $C > B \geq A \approx D$.

From the coupling state shown in FIG. 14, the switch 41 can easily be removed from the panel 49 by pulling it while pushing the resilient plates 34 inwardly by the finger tip. To remove the mounting frame 11 from the switch 41, the bridges 38 of the leg portions 32 on both sides are outwardly expanded so as to disengage the protuberances 43 of the switch main body from the recesses 38a.

Figure 12:
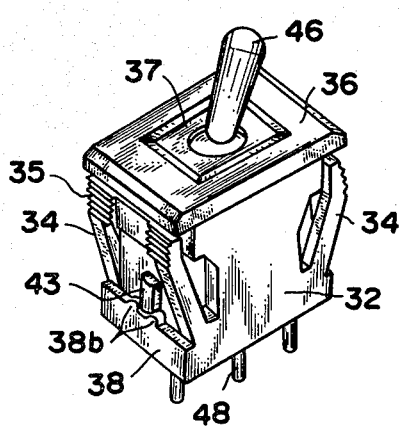
FIG. 12 is a perspective view showing a modified example of the second embodiment.

FIG. 12 is a perspective view showing a modified example of the mounting frame equipped with the decorative plate in accordance with the second embodiment of the present invention. In this modified example, two protuberances 38b are formed on the bridge 38 of the mounting frame as elements that engage with the protuberances 43 of the switch main body. In this modified embodiment, therefore, the protuberance 43 fits into the recesses formed by the two protuberances 38b.

Figure 13:
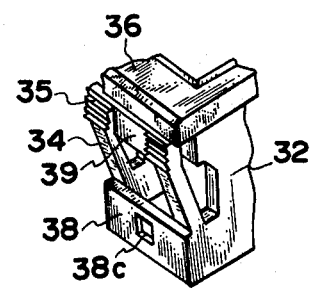
FIG. 13 is a partial perspective view showing another modified example of the second embodiment.

FIG. 13 is a partial perspective view showing another modified example of the mounting frame equipped with the decorative plate in the second embodiment of the present invention. In this modified example, a through-hole 38c is bored on the bridge 38 of the mounting frame as the element engaging with the protuberance 43 of the switch main body.

As still another modified example of the second embodiment, if the width of the switch main body 41 is substantially equal to the distance between the inner sides of the leg portions 32 of the mounting frame 31 as shown in FIG. 10, the switch main body can be fitted to the mounting frame by directly engaging the lower portion of its protuberance 43 to the upper portion of the bridge 39. In such a case, the slit 38a, the protuberance 38b or the through-hole 38c need not be disposed on the bridge 38.

In still another modified example of the second embodiment of the present invention, instead of the protuberance 43 of the switch main body 41 shown in FIG. 9, a recess (not shown) is disposed at this position while a protuberance (not shown) to mate with this recess is formed on the bridge 38 so that coupling between them is effected in the concavo-convex relation. According to this arrangement, the effect equal or superior to those of the aforementioned modified examples can be obtained.

In accordance with the second embodiment of the present invention having the abovementioned construction, the switch mounting frame 31 is fitted to the switch 41 at at least two positions. Namely, the through-hole 37 of the decorative plate 36 engages with the sleeve 45 of the switch and the bridge 38 interconnecting both leg portions 32 is tightly fitted to both outer side surfaces of the switch 41 in the concavo-convex relation. (Two each of the recesses 38a or protuberances 38b or through-holes 38c are fitted to the two protuberances 43 on the side surfaces of the switch main body, respectively.) As a result, coupling between the switch and the mounting frame becomes tight and rigid. (Since the bridge is employed, coupling becomes stronger than that in the first embodiment.) When applied to any kind of switches such as a toggle switch, a lever switch, a push button switch, a wave-shaped switch or the like, the device of this second embodiment of the present invention eliminates shaking of coupling between the switch and the mounting frame due to the switch operation or vibration or impact applied thereto, shaking of coupling between the switch assembly and the panel or deformation generated when the leg portions are outwardly expanded. This embodiment is especially effective for improving structural and operational stability when applied to a ultra-small switch having reduced thickness for the leg portions and the resilient plates.

According to the second embodiment, the resilient plates 34 are so shaped that the force acts in the direction of their width. In other words, they are formed on the right and left side surfaces of the leg portions in the direction of a reduced width but not in the direction of an increased width. In consequence, even when the switch equipped with the resilient plates is fitted to the panel hole and the resilient plates 34 inwardly push the leg portions 32 during the switch operation, the force arising from the switch operation is directed in the direction of the width of the leg portions 32. Hence, no force is generated at all that expands the leg portions with respect to the switch main body 42. In other words, this arrangement perfectly eliminates such problems as occurrence of shaking of the switch as engagement between the switch main body and the mounting frame in the concave-convex relation is released, fall-off of the switch from the mounting frame, occurrence of shaking between the mounting frame and the switch main body due to the force at the time of inclination of the handle, floating of the switch from the panel surface during the switch operation, and so forth.

If a slit (through-hole) or a protuberance is disposed on the bridge in such a manner as to engage with the protuberances or recesses on the right and left side surfaces of the switch main body in the second embodiment, the mounting frame 31 of one kind can be employed for a switch (e.g. 2-way switch) having a switch main body 41 of an increased width such as shown in FIG. 10 as well as for a switch (e.g. one-way switch) having a switch main body 41' of a reduced width such as shown in FIG. 11.

In the second embodiment, if the lower portions of the resilient plates 34 are interconnected to the bridge 38 with the upper portions being interconnected by the bridge 38, the resilient plates never undergo inclination or deformation when the switch-mounting frame assembly is inserted and fitted into the panel frame, even if the thickness of the resilient plates is reduced for the mounting frame of a ultra-small type.

In the second embodiment, if the protuberance 36a having a dimension D approximately equal to the dimension A in FIG. 14 is disposed on the lower surface on the right and left of the decorative plate 36, both outer side surfaces of the protuberance 36a are positioned extremely close to the inner side surface of the panel hole when the mounting frame is inserted and fitted into the panel hole. According to this arrangement, even if the handle is especially strongly inclined to the right and left, the side surfaces of the protuberance 36a butt against the inner side surface of the panel hole and function as a stopper. As a result, a push force exceeding a predetermined level is prevented from acting upon one side of the resilient plate, and since the side surfaces of the protuberance 36a function as the stopper, the mounting frame is prevented from deviating to one side.

Figure 1:
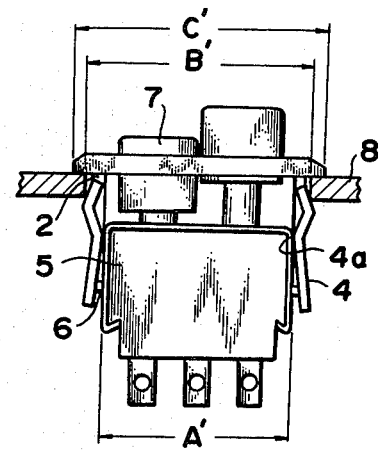
FIGS. 1 and 2 are a front view and a perspective view of the prior art device, respectively.
Figure 2:
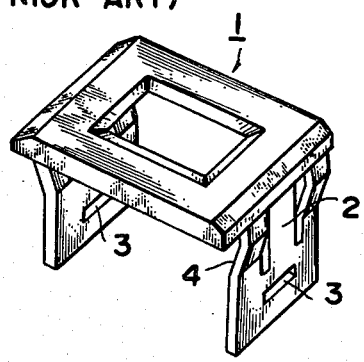

In the conventional mounting frame such as depicted in FIGS. 1 and 2, the corrugated portions disposed on the resilient plates are likely to come off from the switch main body. In the second embodiment of the present invention, however, though the engaging portions between the mounting frame and the switch main body are disposed on the resilient plates in the same way as in the conventional device, the leg portions prevent the mounting frame from outwardly expanding from the switch main body. Hence, the device of this embodiment is free from the problem with the conventional device that the mounting frame comes off from the switch main body.

In accordance with the present invention, the mounting frame as a whole is integrally molded from a synthetic resin material having resiliency at a reduced cost of production. Furthermore, the switch mounting frame equipped with the decorative plate can be inserted and fitted into the switch main body in one-touch operation and the resulting switch-mounting frame assembly can be inserted and fixed to the panel hole of an instrument in one-touch operation.

Though the member to be fixed to the mounting frame is the switch main body in the abovementioned second embodiment of the present invention, it is of course possible to use a pilot lamp in place of the switch main body in the same way as in the first embodiment shown in FIG. 7.

Though the through-hole 37 of the decorative plate 36 and the sleeve 45 to mate with the through-hole in the abovementioned embodiment are a square hole and a square pole, respectively, they may of course be a round hole and a round pole in the same way as in the aforementioned first embodiment.

In the abovementioned embodiment in which a protuberance (not shown) is disposed on the bridge 38 while a recess (not shown) to mate with the protuberance is disposed at the position of the protuberance 43 of the switch main body 41 in place of the protuberance 43, if the width of the switch main body is equal to the gap between the inner surfaces of the leg portions of the mounting frame, the abovementioned recess may be deleted and the protuberance of the bridge 38 can directly be engaged with the switch main body.

Though the present invention has thus been described with reference to some preferred embodiments thereof, the embodiments are merely illustrative but in no way restrictive. Hence, various changes and modifications could be made by those skilled in the art without departing from the scope of the present invention.

What is claimed is:

1. A mounting frame (31) for mounting a switch (41) or the like on a panel (49), which comprises:
   a decorative plate (36) formed with a through-hole (37) to be fitted into an upper sleeve portion (45) of the switch (41);
   two suspending portions (32, 34) integrally formed with and vertically suspended from the lower end portion on both sides of the decorative plate (36) to clamp a main body portion (42) of the switch (41) therebetween, each suspending portion (32, 34) including a leg portion (32) in the form of a flat plate suspended from the decorative plate (36) and a pair of resilient plates (34) integrally formed with and upwardly extending from both lower end portions of the leg portion (32) to be resiliently deformable in the direction of width of the leg portion whereby the pair of resilient plates is fittable into a fitting hole of the panel (49);
   engagement means (38, 38a, 38b, 38c) provided on each suspending portion for engaging with a corresponding engagement portion provided on the main body portion of the switch; and bridges 38 disposed transversely of said resilient plates 34 between the lower portions of said plates; said engagement means being provided on each of bridges (38) and being integrally formed with said leg portions.

2. A mounting frame according to claim 1, further comprising second bridges (39) integrally formed on the upper portions of the resilient plates (34) to interconnect the resilient plates (34) with each other.

3. A mounting frame according to claim 1, wherein said engagement means comprises a recess (38a) formed on each bridge (38) for engaging with the protuberance (43) of the main body (42) of the switch or the like.

4. A mounting frame according to claim 1, wherein said engagement means comprises a pair of protuberances (38b) formed in spaced relationship on each bridge (38) for engaging with the protuberance (43) of the main body (42) of the switch or the like.

5. A mounting frame according to claim 1, wherein said engagement means comprises a through hole (38c) formed on each bridge (38) for engaging with the protuberance (43) of the main body (42) of the switch or the like.

* * * * *